Patented Aug. 7, 1951

2,563,288

UNITED STATES PATENT OFFICE 2,563,288

FIBROUS GLASS PRODUCT AND METHOD OF MAKING THE SAME

Robert Steinman, Newark, Ohio, assignor to Owens-Corning Fiberglas Corporation, a corporation of Delaware No Drawing. Application November 13, 1945, Serial No. 628,355

7 Claims. (Cl. 117—126)

The invention relates to the treatment of fibrous glass materials for the purpose of improving the properties of composite products of resins or plastics and glass fibers; for example, plastic laminates made from said fibrous glass materials and resins or plastics.

In the present state of the art, laminates are made up of a plurality of layers of fibrous glass materials impregnated with resin or plastic. I have discovered that improved results are obtained by first treating or sizing the fibrous glass materials with an organo-silicon compound containing a double bond in the organic radical. I have found a marked improvement in the wet strength of plastic laminates which have been treated in accordance with my invention.

Although my invention is not to be limited by theoretical considerations, I believe that the improved properties of the laminates produced by my invention may, in part, be explained by the fact that the class of organo-silicon compounds which I use for pretreatment of the fibrous glass materials are of such molecular structure that they adhere well both to the glass fibers and to the plastic or resin. The silicon portion reacts with and becomes a part of the glass surface and the double bond in the organic radical of the sizing compounds tends to react with the plastic or resin to form a strong chemical union between these two materials which insures a continued strong bond even in the presence of water or moisture.

While my invention is susceptible of many ramifications, it is of particular importance in the preparation of laminates using fibrous glass cloth which has been prepared in the manner now known to the art by weaving fibrous glass yarns into a fabric. Preferably, the glass cloth is first cleaned by heating or washing to remove such organic materials as may be present prior to weaving, thus leaving the surface of the fibrous material in a condition to readily react with the organo-silicon sizing material which is then applied to the heat-cleaned or washed glass by any suitable method such as dipping, spraying, etc. The sized glass cloth is then treated with a plastic or resin and built up in layers to the desired thickness and subjected to heat and pressure in the manner known to the art to produce the final laminated composition.

The class of organo-silicon compounds embraced by my invention may be described as compounds having the formula,

where $n$ is 1, 2, or 3 (preferably 2), R and R' are hydrogen, alkyl, aryl or halogeno groups of the type chloro, bromo, and iodo, and X is halogen, alkoxy or aryloxy groups, their hydrolysis products and their polymerized products which are silicone materials that are cyclic, linear and three dimensional polymers.

Representative examples of the organo-silicon compounds of this class are as follows:

allyl triethoxy silane
diallyl diethoxy silane
triallyl ethoxy silane
methallyl trichloro silane
trichloroallyl chloro silane
allylphenyl dichloro silane
allylethyl dichloro silane
allylmethyl diethoxy silane
diallylmethyl ethoxy silane
allyl trichloro silane
dimethallyl diethoxy silane The corresponding siloxanes or silicones are also included within this class, for example, diallyl silicone $[(CH_2=CH-CH_2)_2SiO]_x$ and methallyl silicone

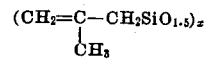

The type of plastics and resins with which the above class of organo-silicon compounds are particularly adapted to react to form improved laminates are the resinous polymers and copolymers formed mainly by addition type polymerization, that is, originally from monomers at least one of which was unsaturated. For instance, the thermosetting, non-condensing resins include the unsaturated polyesters, allyl esters (for example diallyl phthalate), styrene-unsaturated polyester copolymers, thermosetting vinyl type resins, and allylic resins. The plastics and resins themselves are not the subject matter of this invention but are obtainable commercially.

While in the preceding description I have described a method of making laminates having improved compression and flexure properties after immersion in water, it should be understood that my invention is not confined to laminates made from heat-cleaned fibrous glass cloth but is broadly directed to the treatment of glass with an unsaturated organo-silicon compound of the class described in order to form an improved bond between the glass and the plastic or resin thereafter applied.

In specific application, a plastic laminate is formed by first treating the glass fibers before or after they are arranged in sheet-like layers with an organo-silicon compound containing an unsaturated group. Thereafter the layers of treated glass fibers are impregnated with the laminating resin and superposed one on another until the desired thickness is obtained. On the application of heat and pressure the resinous materials are hardened and the mass compacted to produce the laminate.

Alternatively, the organo-silicon compounds may be applied to the glass fibers during their initial formation, preferably by adding the unsaturated organo-silicon compound to a suitable size. Again, the organo-silicon compound may be mixed with the laminating resin and the mixture used to impregnate the glass fibers in order to form the laminate.

It should also be understood that after applying the organo-silicon material to the glass fibers, the impregnated fibrous material may be heated to cause a setting of the organo-silicon material on the glass surface. For example, the heat-cleaned glass cloth impregnated with the organo-silicon compound may be heated from 250° F. to 400° F. and subsequently formed into a laminate with a resin. Again, the heat setting of the organo-silicon material may be accomplished by the heat used in making the laminate after impregnation with the resin.

What I claim as my invention is:

1. The method of modifying the surface characteristics of glass fibers to improve their adherence with resinous materials comprising treating the glass fibers with a solution of diallyl diethoxy silane.

2. The method of modifying the surface characteristics of glass fibers to improve their receptivity for resinous materials comprising treating the glass fibers with a solution of diallyl diethoxy silane and heating the fibers to a temperature of 250° F. to 400° F. to set the silane on the glass fiber surfaces.

3. Glass fibers having a composition consisting essentially of insolubilized diallyl diethoxy silane on the glass fiber surfaces.

4. The method of modifying the surface characteristics of glass fibers to improve adhesion thereto of resinous materials comprising the steps of treating the glass fibers with a composition consisting essentially of a silane having the formula

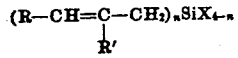

wherein R and R' are selected from the group consisting of hydrogen, halogen, alkyl and aryl radicals and X is a radical selected from the group consisting of halogen, alkoxy and aryloxy and wherein $n$ is a whole number between 1 and 3 inclusive.

5. Glass fibers, the surfaces of which are modified to improve their adhesion with resinous materials by a coating of a composition consisting essentially of silane having the formula

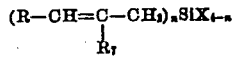

wherein R and R' are selected from the group consisting of hydrogen, halogen, alkyl and aryl radicals and X is a radical selected from the group consisting of halogen, alkoxy and aryloxy and wherein $n$ is a whole number between 1 and 3 inclusive.

6. The method of modifying the surface characteristics of glass fibers to improve adhesion thereto of resinous materials comprising the steps of treating the glass fibers with a composition consisting essentially of an organo silicon compound selected from the group consisting of a silane and the polymerized hydrolysis products thereof, said silane having the formula

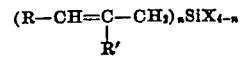

wherein R and R' are selected from the group consisting of hydrogen, halogen, alkyl and aryl radicals and X is a radical selected from the group consisting of halogen, alkoxy and aryloxy and wherein $n$ is a whole number between 1 and 3 inclusive.

7. Glass fibers, the surfaces of which are modified to improve their adhesion with resinous materials by an organo silicon compound selected from the group consisting of a silane and the polymerized hydrolysis products thereof, the silane having the formula

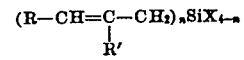

wherein R and R' are selected from the group consisting of hydrogen, halogen, alkyl and aryl radicals and X is a radical selected from the group consisting of halogen, alkoxy and aryloxy and wherein $n$ is a whole number between 1 and 3 inclusive.

ROBERT STEINMAN.

REFERENCES CITED

The following references are of record in the file of this patent:

UNITED STATES PATENTS

| Number | Name | Date |
|---|---|---|
| 1,970,328 | MacIldowie | Aug. 14, 1934 |
| 2,184,326 | Thomas | Dec. 26, 1939 |
| 2,258,218 | Rochow | Oct. 7, 1941 |
| 2,258,221 | Rochow | Oct. 7, 1941 |
| 2,343,600 | Weimann | Mar. 7, 1944 |
| 2,352,974 | Rochow | July 4, 1944 |
| 2,366,514 | Gaylor | Jan. 2, 1945 |
| 2,372,048 | Auxier | Mar. 20, 1945 |
| 2,386,466 | Hyde | Oct. 9, 1945 |
| 2,386,793 | Hanford | Oct. 16, 1945 |
| 2,388,161 | Kropa | Oct. 30, 1945 |
| 2,390,370 | Hyde | Dec. 4, 1945 |
| 2,392,805 | Biefeld | Jan. 15, 1946 |
| 2,409,633 | Kropa | Oct. 22, 1946 |
| 2,436,304 | Johannson | Feb. 17, 1948 |
| 2,439,689 | Hyde | Apr. 13, 1948 |